United States Patent [19]

Wyss et al.

[11] 4,193,837
[45] Mar. 18, 1980

[54] THIN LAYER EVAPORATORS

[75] Inventors: Franz J. Wyss, Uzwil; Peter Hug, Bischofszell, both of Switzerland

[73] Assignee: Gebrueder Buehler AG, Uzwil, Switzerland

[21] Appl. No.: 908,574

[22] Filed: May 22, 1978

[30] Foreign Application Priority Data

Jun. 7, 1977 [CH] Switzerland .................. 6982/77

[51] Int. Cl.² .................................................. B01D 1/16
[52] U.S. Cl. .............................. 159/6 W; 159/13 A; 159/24 R; 203/26; 202/236
[58] Field of Search .............. 159/6 R, 6 W, 13 A, 159/49, 24 R, 24 A; 203/26; 202/236

[56] References Cited

U.S. PATENT DOCUMENTS

| 2,492,333 | 12/1949 | Swindin | 159/6 W |
| 2,542,269 | 2/1951 | Zahm | 159/6 W |
| 3,190,817 | 6/1965 | Neugebauer et al. | 159/24 R |
| 3,695,327 | 10/1972 | Widmer | 159/6 W |

Primary Examiner—Norman Yudkoff

Attorney, Agent, or Firm—Edward J. Brenner

[57] ABSTRACT

Thin-layer evaporators are described in which evaporation cylinders and a cylindrical vapor-collection vessel of the same height are mounted to expand in parallel between horizontal base and top plates joined by a vertical jacket surrounding the cylinders and vessel and confining together with the plates a steam jacket. Rotors in the cylinders apply thin layers of the substance to be dried to the inner surfaces of the cylinders, from the tops of which vapors are discharged to the top of the vessel. A collecting conduit leads vapor from the bottom of the vessel to a compressor that delivers the compressed vapor to join a supply of super-heated steam passing into the steam jacket. Droplets separated in the vessel are discharged from the vessel through an outflow conduit. Solids and/or concentrates fall out of the evaporation cylinders into a clearing chamber from which they are evacuated into a trap by a rotary scoop. All the pipework is arranged so that the vertical jacket can be lifted off the base plate to expose the interior parts for servicing.

14 Claims, 5 Drawing Figures

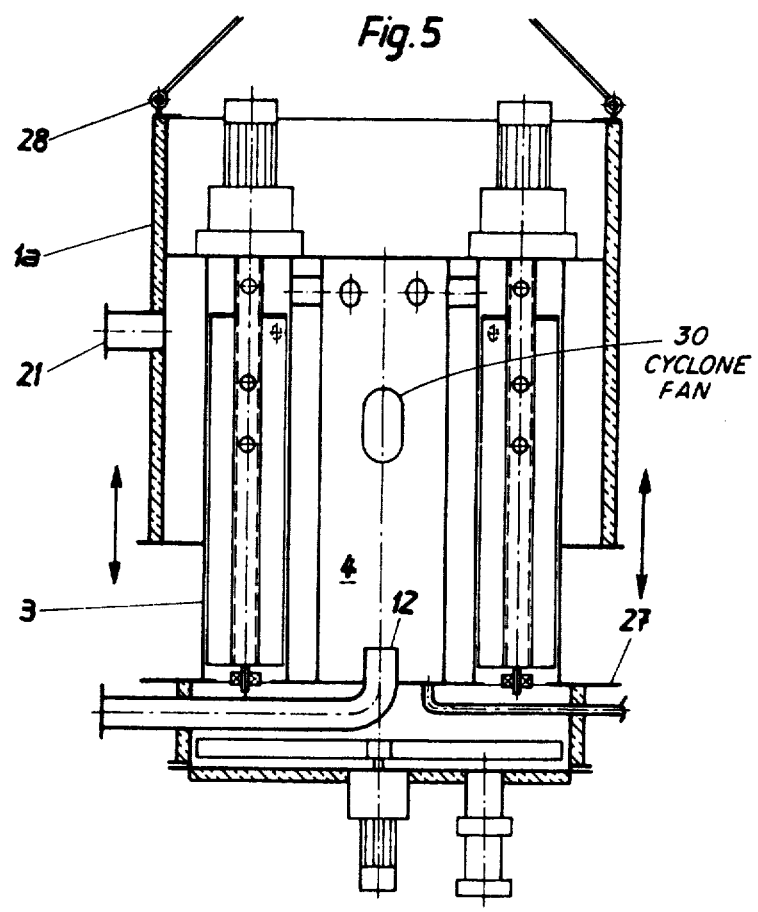
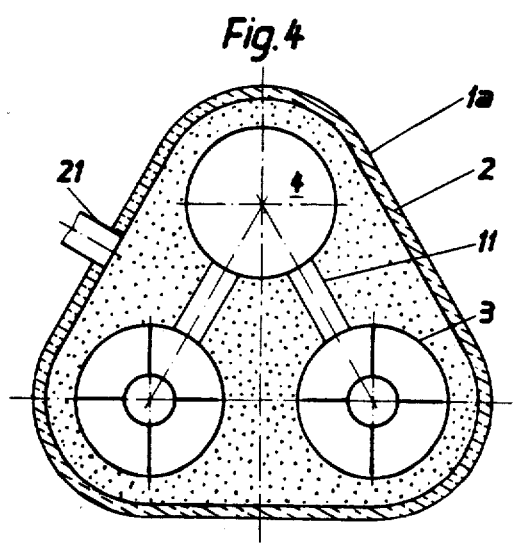

THIN LAYER EVAPORATORS

FIELD OF THE INVENTION

The invention relates to a thin-layer evaporator for the drying of sludge and similar substances, consisting of an arrangement of at least two vertically extending evaporation cylinders in a common housing fed with super-heated steam, where each evaporation cylinder comprises a driven rotor arrangement for the application of the medium to be dried to the inner wall of the cylinder in a thin layer and its outer wall is exposed to the super-heated steam for the supply of the heat necessary for the evaporation process, a common vapour-collector vessel with a compressor connected thereto being associated with the evaporation cylinders.

In the operation of such an apparatus it is desirable to achieve an optimum evaporation process with as little energy as possible.

DESCRIPTION OF THE PRIOR ART

The basic principles of the thin-layer evaporator and the lateral spreading of the medium to be concentrated on the inner surface of the evaporation cylinder with the aid of a rotor device are familar to the person acquainted with the art. Such apparatuses are described by way of example in U.S. Pat. Nos. 2,546,381 and 3,067,812.

It is also already known to arrange several evaporation cylinders in the same housing, as shown for example in Swiss Pat. No. 376,882, Great Britain Pat. No. 180,963 and U.S. Pat. No. 3,575,814, in installations for recovering fresh water from sea water.

Regarding the rational manner of operation of the evaporators, the re-use of the vapours for the heating of the evaporation cylinders with interposition of a compressor is also known (Swiss Pat. No. 376,882, German Pub. Sp. 1,459,487, U.S. Pat. No. 3,575,814).

However, one disadvantage of these installations is on the one hand the complicated style of construction and on the other the great heat losses in the overall arrangement. In the one known arrangement for fresh water preparation (U.S. Pat. No. 3,575,814) for example a special steam generator must be provided for the heat losses, while in another (Great Britain Pat. No. 180,963) an expensive insulated pipe system with special devices such as conveyor and agitator memebers, and drive systems, is necessary to keep the heat losses as small as possible.

The vapours must be fed to a droplet separator before passing on to the compressor, in order to guarantee trouble-free operation of the compressor. In several known types of apparatus the droplets separator lies outside the housing between a compressor and evaporation plant, so that pipe connections with expensive insulation are necessary. As soon as several evaporation cylinders are connected together, the pipe connections also have a disadvantageous effect upon easy dismantling of the entire apparatus.

Since the heating of the evaporation cylinders takes place with super-heated vapours, especially in the case of sludge treatment, a layer of dirt forms in time on the wall of the evaporation cylinders, impairing the heat transmission. The removal of this dirt layer and also maintenance, cleaning or repair of scrapers, which can be provided according to one known proposal Great Britain Pat. No. 180,963) in the vapour heated interior of the evaporation cylinders, is possible only after time-consuming and extensive dismantling.

A further disadvantage is the vapour-collecting space lying above the evaporation cylinders (Swiss Pat. No. 376,882) or extending out beyond them (U.S. Pat. No. 3,575,814). Dismantling the installation is made additionally difficult and its construction height is enlarged by this arrangement, but also due to mechanical equipment and associated pipes which are provided in the region close to the roof and in the region close to the floor of the housing surrounding the evaporators.

SUMMARY OF THE INVENTION

The invention is based upon the problem of avoiding the disadvantages of the prior art, that is especially of producing a thin-layer evaporator for the drying of sludge and similar substances which, with a simple style of construction, works with minimum heat losses, and is simple to maintain and clean.

This problem is solved in accordance with the invention in that a self-contained vapour-collecting vessel is provided standing beside the evaporation cylinders and with walls extending parallel with their longitudinal axis, which vessel has the same height as the evaporation cylinders and is in communication in its upper end section through a vapour removal conduit with the upper zone of each of the evaporation cylinders and at its lower end through a collector conduit extending below the housing with a compressor, and in that the housing in formed for separation into two parts.

The advantages achieved with the invention consist especially in that by the arrangement of the vapour-collection space beside the evaporation cylinders a simpler and thus cost-saving style of construction of the thin-layer evaporator is rendered possible. Rapid dismantling for the necessary maintenance tasks is guaranteed, since the whole housing jacket can be lifted away in a simple manner. The conducting away of the vapours in fact takes place below the housing jacket surrounding the evaporation cylinders, so that the housing wall is interrupted only by a supply conduit for the super-heated steam and one for the medium to be dried, and the entire arrangement becomes accessible after the lifting away of the housing jacket. The arrangement of a vapour-collecting vessel of the same height beside the evaporation cylinders also leads to a reduction of the construction height.

The invention also relates to a method for the drying of sludge and similar substances in a thin-layer evaporator. The method is characterised in that the vapours occurring in the evaporation spaces are conducted to a self-contained collection space situated beside the evaporation spaces and extending parallel therewith to the same height and then, from this collection space, by passing the zone of movement of a separable jacket surrounding all the spaces in common, to a compression device and thereupon to an intermediate space present between the evaporation spaces and the collecting space within the jacket.

The liquid droplets contained in the vapours can advantageously be separated out in the collection space, by bringing the vapours collected therein into cyclone-type turbulence.

It is advisable to remove the purified steam and the separated liquid separately from the collection space.

DESCRIPTION OF THE DRAWINGS

Examples of the invention will now be described in some detail with reference to the accompanying drawings, in which:

FIG. 4 shows a second example of a thin-layer evaporator constructed according to the invention; and FIG. 5 is similar to FIG. 1 but shows a housing jacket being hoisted away from the evaporator.

Figure 1:
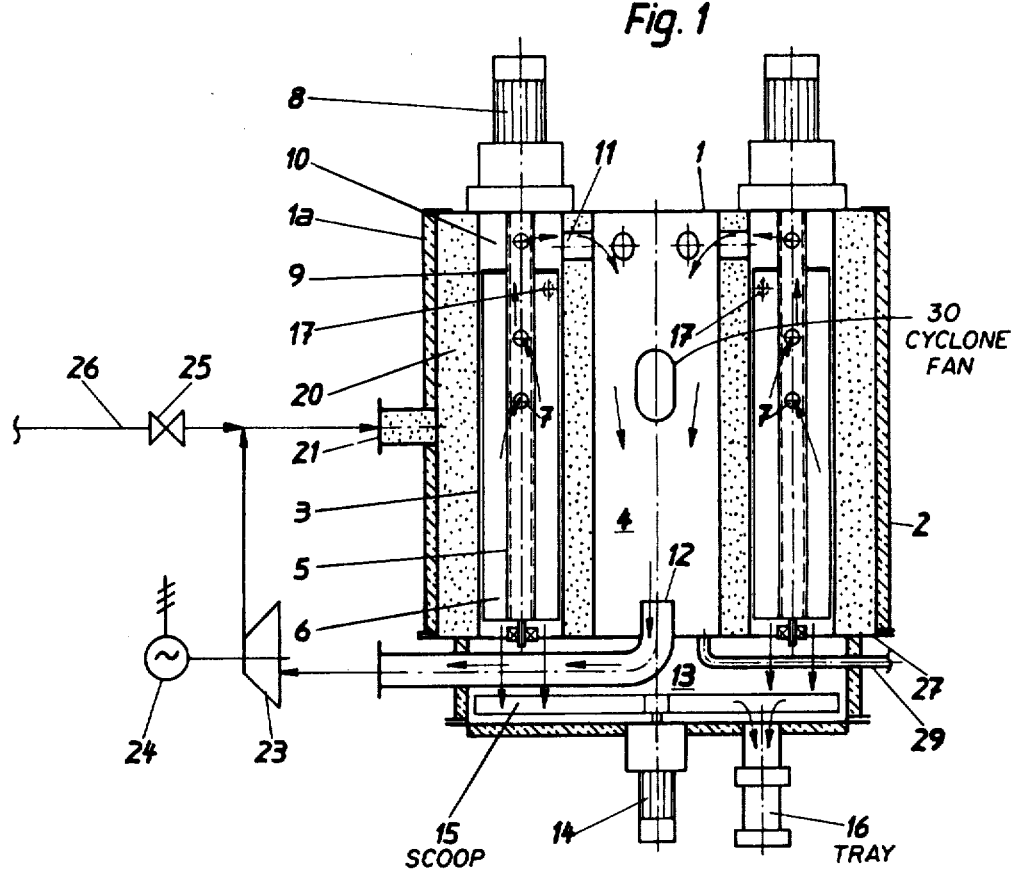
FIG. 1 shows a longitudinal section through a first example of a thin-layer evaporator constructed according to the invention.

The apparatus as shown in FIG. 1 comprises a housing 1 with a housing jacket 1a which is covered with an insulation layer 2.

Within the housing 1, evaporation cylinders 3 are arranged in a circle around a vapour-collection vessel 4 of equal height. The heat necessary for the evaporation is fed to the outer walls 22 of the evaporation cylinders 3 with the aid of super-heated steam 20. This super-heated steam flows through a steam inlet 21 into the interior of the housing 1.

Within each evaporation cylinder 3 there rotates a rotor arrangement 6 carried by a hollow shaft 5. The hollow shafts 5 are provided with openings 7 and are driven by one or more electric motors 8.

In each of the evaporation cylinders 3 an upper region 10 is limited by a plate 9 secured on the hollow shaft 5. The vapour-collection vessel 4 is connected by withdrawal conduits 11 with the upper zones 10 of the evaporation cylinders 3. For conducting away the vapours it has a collecting conduit 12 on its bottom, which is connected to a compressor 23.

Beneath the evaporation cylinders 3 there lies a support containing a clearing chamber 13 with a clearing scoop 15 driven by a drive system 14. The clearing chamber 13 is discharged through an eccentrically arranged trap 16.

Figures 2, 3:
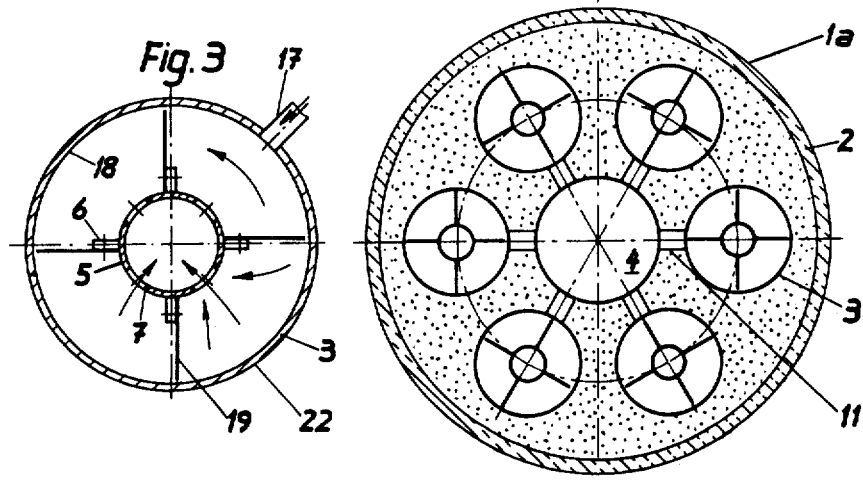
FIG. 2 shows a cross-section of FIG. 1.
FIG. 3 shows a cross-section through an evaporation cylinder.

In the operation of the apparatus the medium to be dried is conducted, as shown in FIG. 3, by way of several feed openings 17 lying beneath the plates 9 into the interior of the evaporation cylinders 3. It flows downwards on the inner wall 18 of the cylinder and is distributed on this inner wall in the form of a thin film by the rotor blades 19 of the rotor arrangement 6. The rotor blades 19 are adjustably secured on the hollow shaft 5 in such a way that the layer thickness of the film on the inner wall 18 amounts to about 0.5 to 1 mm. Since the rotor blades 19 not only apply the medium to be dried but at the same time also scrape the solids or concentrates away from the inner wall 18, they are made from spring steel, but other materials are also usable.

After the solid components or concentrates are scraped away from the inner wall 18 they drop down into the clearing chamber 13 where they are discharged through the trap 16 with the aid of the clearing scoops 15.

The vapours rise through the openings 7 of each hollow shaft 5 into the upper zone 10 of the evaporation cylinders 3. Thence they are sucked through withdrawal conduits 11 into the vapour collection vessel 4. The collecting conduit 12 opening through the bottom into the latter leads beneath the housing jacket 1a surrounding the evaporation cylinders 3 outwards to the compressor 23. Due to this design as may be seen the object is achieved that despite several evaporation cylinders only one discharge conduit has to be conducted to the exterior. Moreover, the conducting-away of the vapours through the bottom of the vapour-collection vessel 4 facilitates the lifting of the housing jacket 1a since the collecting conduit 12 does not prevent this operation. The same applies to the withdrawal of the solids downwards, so that none of these conduits has to be removed before the housing jacket 1a is lifted.

The heat contained in the vapours is expediently re-used for the heating of the evaporation cylinders. For this purpose however they must be brought by means of the compressor 23 to a higher pressure corresponding to the temperature difference between the two sides of the wall of the evaporation cylinder 3. The exploitation of the vapour heat in this way is generally known to the person acquainted with the art. The selection of the suitable compressor also offers no difficulty of any kind to the person acquainted with the art. Thus by way of example for the compression of the vapours a rotary piston compressor can be used. The compressor 23 is driven by an electric motor 24.

The compressed vapours pass from the compressor 23 to the steam inlet 21 of the housing 1. The installation can be started up with the aid of fresh steam 26 from a steam generator (not shown) through a valve 25 preceeding this steam inlet 21.

In order to guarantee a trouble-free running of the compressor 23 the supplied vapours must be cleansed of the entrained droplets. This droplet separation advantageously takes place directly in the vapour collection vessel 4. A droplet separator lying outside the housing 1 would have the disadvantage that expensive pipes would have to be fitted, having expensive thermal insulation.

The droplet separation can be realised especially advantageously if a cyclone fan 30 is installed in the vapour-collection vessel 4. This fan 30 projects the individual droplets against the inner wall of the vapour-collection vessel 4 whence they flow downwards and are conducted away through an outflow conduit 29 provided for this purpose.

In order further to inhibit the heat losses it would for example also be conceivable to accommodate the compressor likewise in the interior of the vapour-collection vessel 4.

As illustrated in FIG. 4 the vapour-collection vessel 4 does not absolutely necessarily have to lie in the centre of the arrangement. Moreover, it can have a form other than that shown in the drawing without departing from the scope of the invention. The important point is that the vapour-collection vessel 4 does not protrude above the evaporation cylinders 3.

Since the evaporation cylinders 3 are heated with the compressed vapours, after the starting up of the installation deposits can form in time on the outer walls 22 of the evaporation cylinders 3. These deposits must be removed regularly, since they are detrimental to the passage of heat through the cylinder wall. In order that this cleaning work may be carried out the evaporation cylinders 3 must be capable of being exposed, which is effected advantageously by lifting of the housing jacket 1a.

Every pipe leading to the exterior is liable to be a hindrance to the lifting away of the housing jacket 1a. Due to the conducting away of the vapours in accordance with the invention by way of the collecting conduit 12 beneath the evaporation cylinders 3 the accessibility both of the latter and also of the vapour-collection vessel 4 is guaranteed.

FIG. 5 shows an apparatus having the features of the example according to FIG. 1, while the housing jacket 1a is being lifted. The evaporation cylinders 3 and the vapour-collection vessel 4 are arranged on the same base plate 27. The collecting conduit 12 for the vapours leads to the exterior beneath this base plate 27. Thus for the lifting of the housing jacket 1a it is only necessary to disconnect the flange connections of the steam inlet 21 for the super-heated steam and the supply conduit for the medium to be dried (not shown).

The housing jacket 1a is equipped with securing elements 28 with the aid of which it can be lifted by a suitable hoist. Due to this design it is possible in a surprisingly simple manner to clean the evaporation cylinders 3, without complicated dismantlement work.

Equally simply each rotor arrangement 6 can be removed upwards from the relevant evaporation cylinder 3 after the disconnection of the flange of the associated drive motor 8 from the lid of the housing 1, for maintenance or repair purposes.

We claim:

1. A thin-layer evaporator for the drying of sludge and similar substances comprising support means, at least two evaporation cylinders respectively having vertical axes extending upward from said support means, rotors respectively mounted in said evaporation cylinders, each rotor being constructed and arranged to apply a thin layer of a substance to be dried along a major portion of the inner wall surface of its associated evaporation cylinder extending substantially from the base thereof to an upper zone within said cylinder, motor means for rotating said rotors, a vapor-collection vessel mounted laterally with respect to and spaced from said evaporation cylinders said vessel having its lateral walls substantially parallel to said axes and substantially the same height as said cylinders, vapor-collection vessel, a compressor connected to said connection conduit to compress said vapor from said collection conduit, housing means for confining a steam jacket around said evaporation cylinders and said vapor-collection vessel whereby the walls of said cylinders and vessel can be heated, and an inlet duct means connected to said compressor and said housing to direct vapors transversely of said evaporation cylinders and said vapor-collection vessel for the admission of the resultant compressed vapors as a super-heated steam into said housing means so that said evaporation cylinders and said vapor-collection vessel are exposed to said super-heated steam at substantially the same time, said housing means being constructed for division into two parts shaped to render said evaporation cylinders and vapor-collection vessel accessible when said parts are separated.

2. An evaporator according to claim 1, provided with more than two of said evaporation cylinders equidistantly separated from one another around a circle having said vapour-collection vessel at its centre.

3. An evaporator according to claim 1, in which said housing means comprise a base plate on said support means and from which said evaporation cylinders and said vapour-collection vessel extend upwards, and a housing jacket surrounding said cylinders and vessel on all sides and separable from said base plate.

4. An evaporator according to claim 3, in which said housing jacket, when the evaporator is operative, is supported by said base plate but can be separated therefrom by lifting said housing jacket vertically upwards.

5. An evaporator according to claim 3, including an outlfow conduit leading out of the bottom of said vapour-collection vessel and through said base plate for the discharge of liquid separated from vapour in said vessel, said evaporation cylinders being formed with discharge openings for the discharge of solids and concentrates occurring at the bottoms of said cylinders, said discharge openings being common to said base plate.

6. An evaporator according to claim 1, including a droplet separator mounted in said vapour-collection vessel.

7. An evaporator according to claim 5, in which said droplet separator is a cyclone fan.

8. An evaporator according to claim 1, in which said vapour-collection vessel is constructed as a droplet separator.

9. An evaporator according to claim 1, in which said vapour-collection vessel is formed as a unit with one of said two parts of said housing.

10. A thin-layer evaporator for the drying of sludge and similar substances comprising support means formed with a cleaning chamber, at least two evaporation cylinders respectively having vertical axes extending upward from said support means, said evaporation cylinders are formed with discharge openings for the discharge of solids and concentrates occurring at the bottoms of said cylinders, rotors respectively mounted in said evaporation cylinders, each rotor being constructed and arranged to apply a thin layer of a substance to be dried along a major portion of the inner wall surface of its associated evaporation cylinder extending substantially from the base thereof to an upper zone within said cylinder, motor means for rotating said rotors, a vapor-collection vessel mounted laterally with respect to and spaced from said evaporation cylinders, said vessel having its lateral walls substantially parallel to said axes and substantially the same height as said cylinders, withdrawal conduits respectively connecting said cylinders, at said upper zone of each said cylinder, to said vapor-collection vessel substantially at the upper end thereof, a collection conduit mounted to discharge vapor from the lower end of said vapor-collection vessel, a compressor connected to said connection conduit to compress said vapor from said collection conduit, housing means for confining a steam jacket around said evaporation cylinders and said vapor-collection vessel whereby the walls of said cylinders and vessel can be heated, an inlet duct connected to said compressor for the admission of the resultant compressed vapors as a super-heated steam into said housing means, said housing means being constructed for division into two parts shaped to render said evaporation cylinders and vapor-collection vessel accessible when said parts are separated, a rotary clearing scoop mounted in said clearing chamber for rotation about a vertical axis, a motor for rotating said clearing scoop, and a trap for said solids and concentrates mounted eccentrically with respect to said scoop axis and in the bottom of said clearing chamber for receiving solids and concentrates swept thereinto by said clearing scoop, said scoop axis, being positioned so that said scoop when rotating engages solids and concentrates passing through said discharge openings and carries them to said trap.

11. A method of drying a sludge-like substance comprising introducing the substance into a plurality of similar evaporation cylinders mounted vertically between common base and top planes, applying a thin layer of the substance to be dried along major portions of the inner wall surface of said evaporation cylinders by means of rotors in said cylinders, conducting vapor from the upper ends of said cylinders to the upper end of a vapor-collection vessel common to said cylinders and extending from the common base upward to said top plane, discharging vapor from the bottom of said vapor-collection vessel along a first path to a compressor, and delivering compressed vapor from said compressor along a second path into a steam jacket surrounding said evaporation cylinders and said vapor-collection vessel transversely of said evaporation cylinders and said vapor-collection vessel for heating said cylinders and vessel so that the evaporation cylinders and said vapor-collection vessel are exposed to said vapor at substantially the same time.

12. A method according to claim 11, including separating droplets contained in said vapours while in said vapour-collection vessel and removing the separated liquid from said vapour-collection vessel along a path separate from said first-mentioned path.

13. A method according to claim 12, in which said vapour separation is effected by cyclone-type turbulence.

14. A method according to claim 11 including the additional step of cleaning the outer surfaces of said evaporation cylinders and said vapor-collection vessel from time to time by removing a housing jacket confining said steam jacket to thereby permit access to said outer surfaces, said paths being selected to enable said housing jacket to be removed without hindrance from its operative position.

* * * * *